United States Patent
Kiwan et al.

(10) Patent No.: US 11,603,818 B1
(45) Date of Patent: Mar. 14, 2023

(54) METHODS AND SYSTEM FOR PREPARING AN ENGINE FOR STARTING

(71) Applicant: Ford Global Technologies, LLC, Dearborn, MI (US)

(72) Inventors: Rani Kiwan, Canton, MI (US); Chris Glugla, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/450,256

(22) Filed: Oct. 7, 2021

(51) Int. Cl.
*F02N 9/04* (2006.01)
*F02N 19/04* (2010.01)

(52) U.S. Cl.
CPC ............... *F02N 9/04* (2013.01); *F02N 19/04* (2013.01)

(58) Field of Classification Search
CPC .................................. F02N 9/04; F02N 11/04
USPC ............ 123/253, 266, 267, 273, 275, 179.3, 123/179.16, 179.18
See application file for complete search history.

(56) References Cited

U.S. PATENT DOCUMENTS

| | | | | |
|---|---|---|---|---|
| 5,687,682 A | * | 11/1997 | Rembold | F02N 9/04 123/179.5 |
| 6,050,231 A | * | 4/2000 | Tisch | F02N 19/004 123/179.5 |
| 7,770,555 B2 | * | 8/2010 | Matsuda | F02P 15/08 123/514 |
| 8,955,473 B2 | * | 2/2015 | Zhang | F02F 1/10 123/41.14 |
| 10,400,696 B2 | * | 9/2019 | Blaxill | F02B 19/1085 |
| 10,626,816 B2 | | 4/2020 | Surnilla et al. | |
| 10,975,789 B2 | | 4/2021 | Martz et al. | |
| 11,255,240 B1 | * | 2/2022 | Glugla | F02P 15/02 |
| 2016/0348620 A1 | * | 12/2016 | Ramseyer | F02B 39/10 |
| 2018/0134272 A1 | * | 5/2018 | Doering | F02D 41/123 |
| 2019/0195185 A1 | * | 6/2019 | Money | F02D 41/062 |
| 2021/0262408 A1 | * | 8/2021 | Glugla | F02D 41/3094 |
| 2021/0324784 A1 | * | 10/2021 | De Cesare | F02B 19/12 |

FOREIGN PATENT DOCUMENTS

DE 19514500 A1 10/1996
JP 5369117 B2 12/2013

OTHER PUBLICATIONS

Glugla, C. et al., "Systems and Methods for a Combined Pre-Chamber and Thermactor Air System," U.S. Appl. No. 17/142,089, filed Jan. 5, 2021, 77 pages.
Kiwan, R. et al., "Methods and Systems for Reducing Catalyst Cooling During Fuel Cut via Pre-Chamber Ignition System," U.S. Appl. No. 17/305,023, filed Jun. 29, 2021, 74 pages.

* cited by examiner

Primary Examiner — Phutthiwat Wongwian
Assistant Examiner — Arnold Castro
(74) Attorney, Agent, or Firm — Vincent Mastrogiacomo; McCoy Russell LLP

(57) ABSTRACT

Systems and methods for preparing an engine for a cold start are described. In one example, the air is injected into one or more pre-chambers of engine cylinders in response to an engine start request so that one or more cylinders may be heated before the engine is started. The engine may or may not be rotated while air is being injected to pre-chambers of engine cylinders.

20 Claims, 4 Drawing Sheets

FIG. 1

METHODS AND SYSTEM FOR PREPARING AN ENGINE FOR STARTING

FIELD

The present description relates to methods and a system for preparing a cold engine for starting. The methods and systems may be particularly useful for vehicles that include engines with cylinder pre-chambers.

BACKGROUND AND SUMMARY

An engine may be cold started from time to time. A cold engine may emit higher levels of emissions and may exhibit reduced combustion stability. The higher emissions and combustion stability may be due at least in part to fuel vaporization issues within the engine. In particular, fuel injected into cylinders of a cold engine may condense and form liquid droplets. The droplets may tend to adhere to cylinder walls where they may not completely combust before being exhausted from the engine, thereby increasing engine emissions. In addition, the fuel droplets may migrate to the engine's crankcase where they may dilute the engine oil, which may degrade lubrication properties of the oil. Therefore, it may be desirable to provide a way of starting a cold engine that may promote fuel being in a vapor state during engine starting.

The inventors herein have recognized the above-mentioned issues and have developed a method for operating an engine, comprising: activating a compressor and injecting air into a pre-chamber of a cylinder in response to an engine start request.

By injecting air into a pre-chamber of a cylinder in response to an engine start request, it may be possible to provide the technical result of heating an engine cylinder before fuel is injected to the cylinder so that a possibility of fuel injected into the cylinder being in a vapor form may increase. Specifically, a compressor may heat air before the air is injected to engine cylinders. The heated air may enter engine cylinders via injectors in a pre-chamber. If a cylinder's valves are open, the warmed air may exit the cylinder after transferring heat to the cylinder and combustion chamber. If a cylinder's poppet valves are closed, the air that enters the cylinder may be bled off from time to time to provide recently heated air to the cylinder. Consequently, cylinder walls and the combustion chamber may be heated prior to injecting fuel to the engine so that the injected fuel may have a better chance of being in vapor form when the engine is started.

The present description may provide several advantages. In particular, the approach may reduce emissions of engines that are cold started. In addition, the approach may be performed on cylinders having open poppet valves and on cylinders that have closed poppet valves. Further, the approach may also utilize compression heating in cylinders to exchange heat between cylinders to improve cylinder heating.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where:

FIG. 1 is a schematic diagram of an engine;

DETAILED DESCRIPTION

Figure 1:
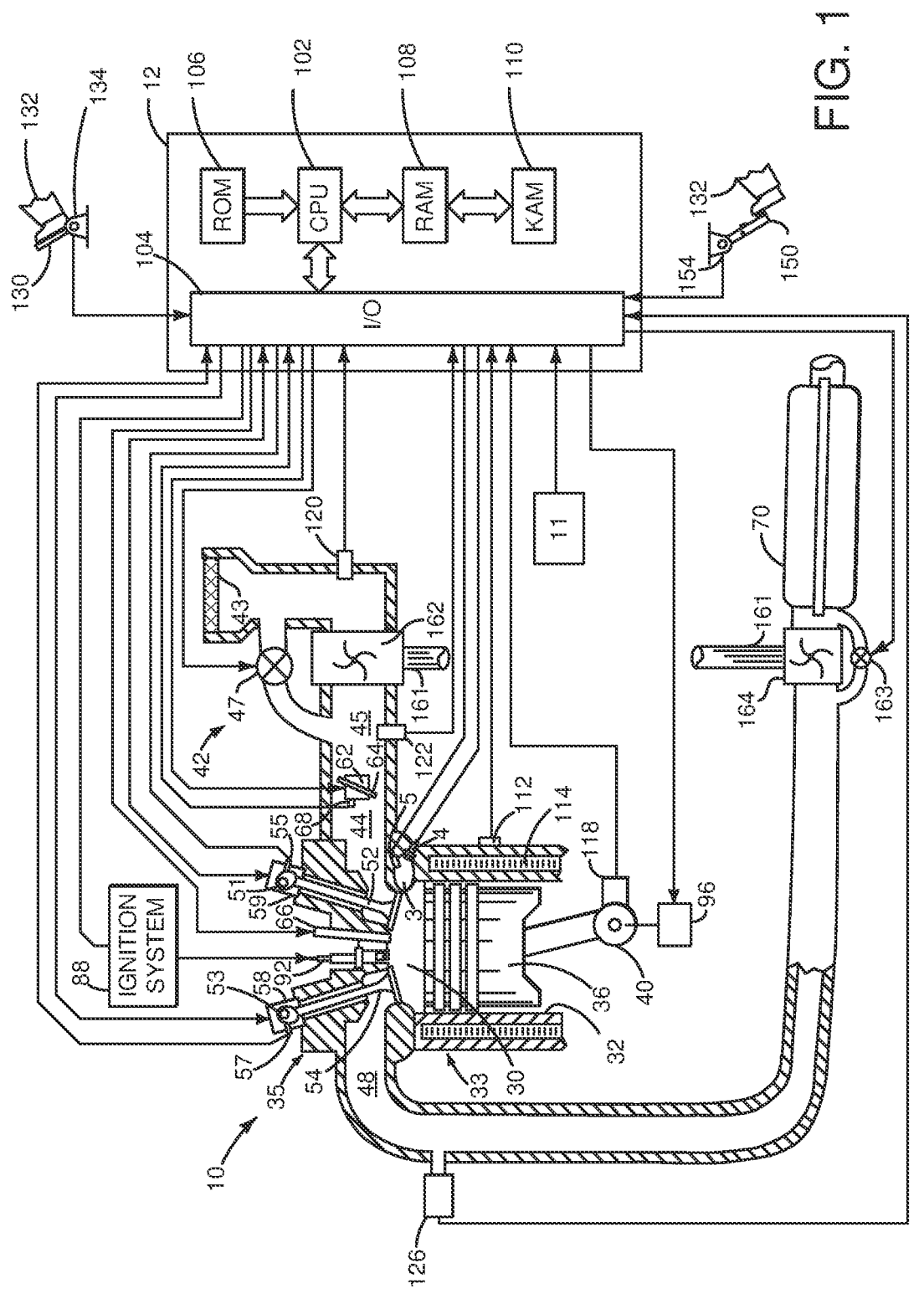
Figure 2:
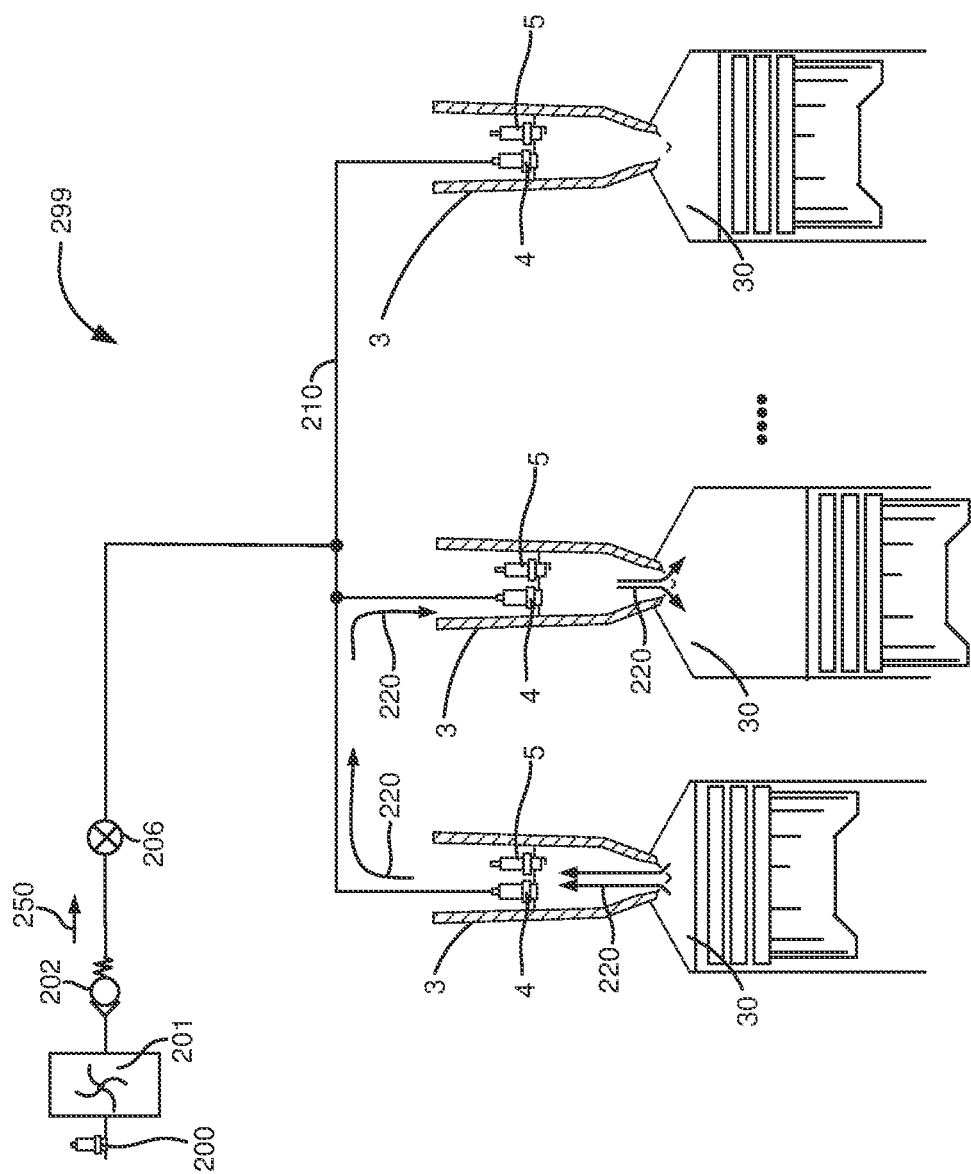
FIG. 2 is a schematic diagram of cylinder pre-chambers coupled to a compressor.
Figure 3:
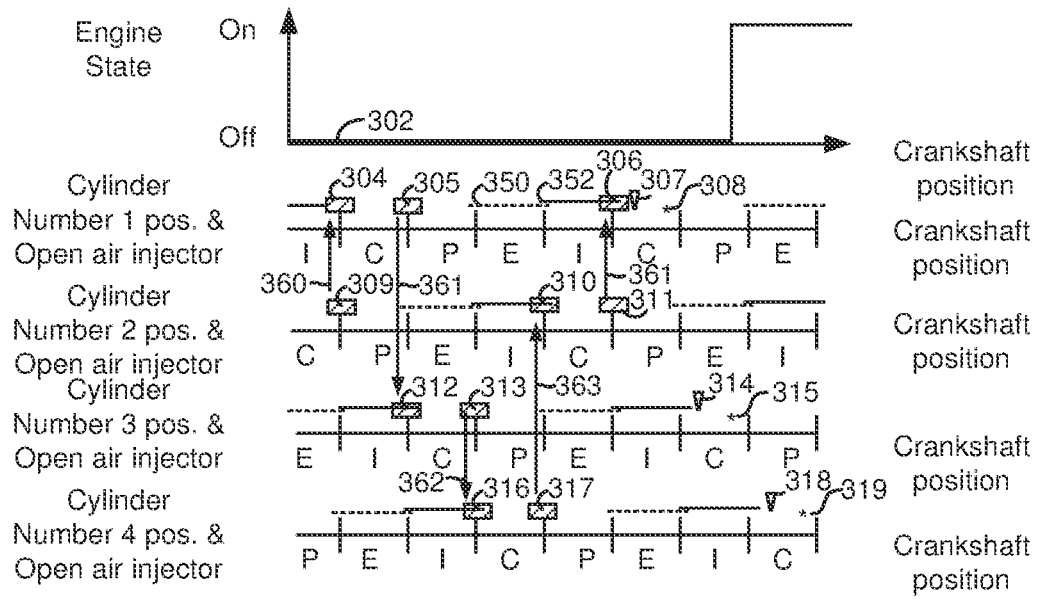
FIGS. 3 and 4 show to example engine cylinder heating sequences.
Figure 4:
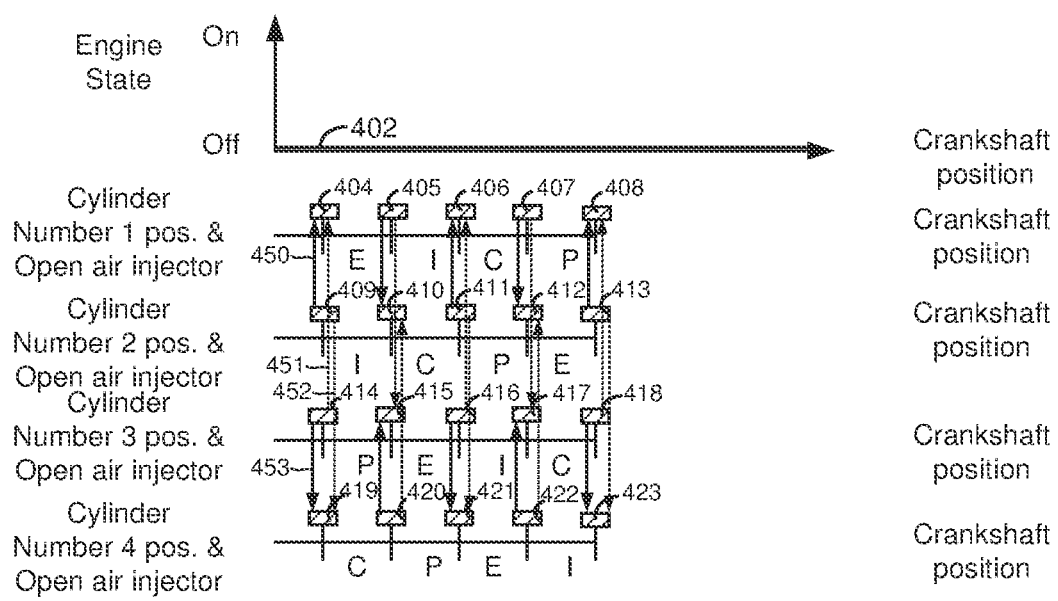
Figure 5:
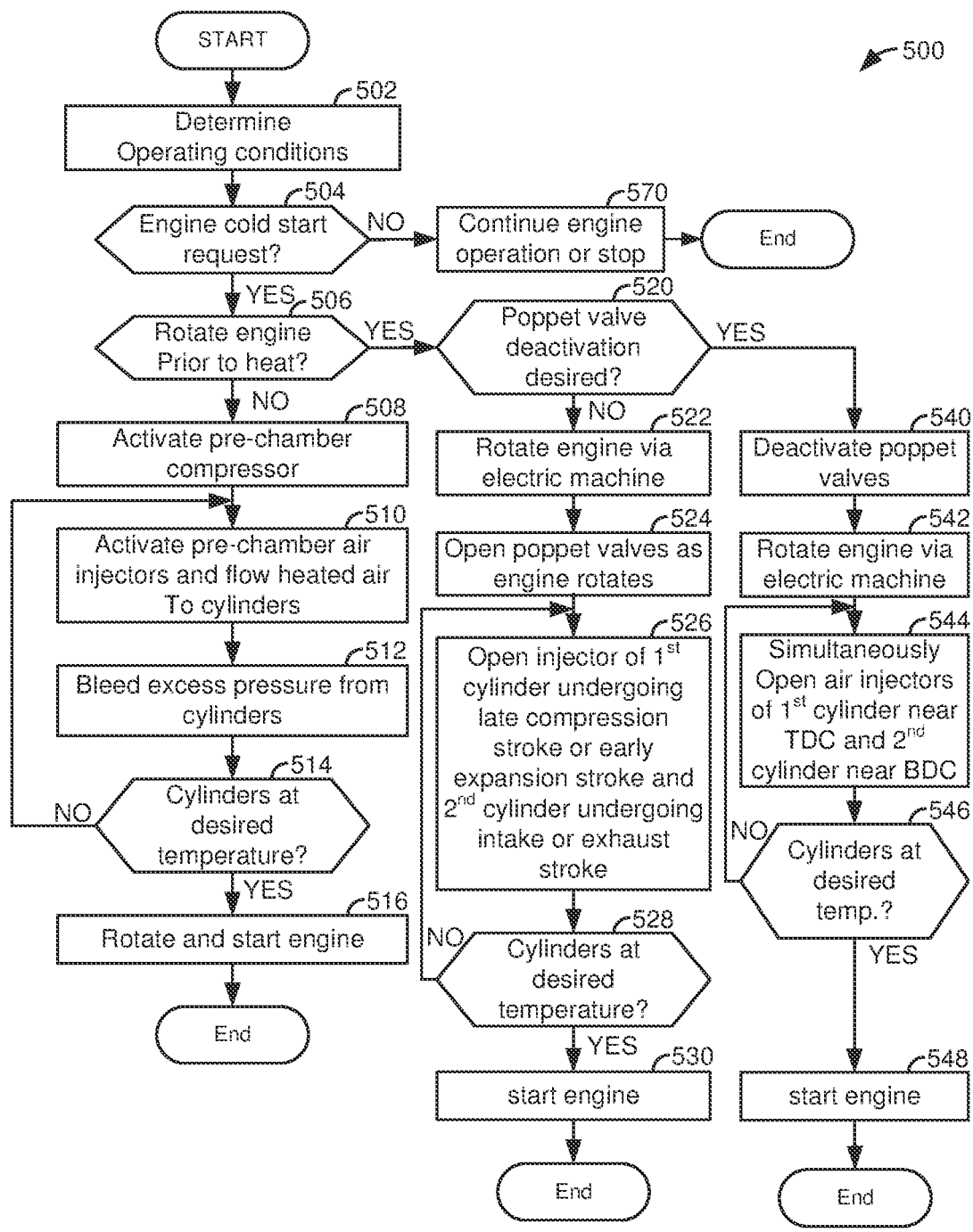
FIG. 5 shows a flowchart of a method for heating engine cylinders and starting an engine.

The present description is related to improving starting of an engine. When the engine is cold, it may be pre-heated before fuel is supplied to the engine so that fuel vaporization may be increased and so that the possibility of creating fuel droplets and puddles within the cylinder may be reduced. Increasing fuel vaporization and reducing fuel droplets may improve engine combustion stability and reduce engine emissions. The engine to be started may be an internal combustion engine as shown in FIG. 1. The engine may include pre-chambers for each cylinder as shown in FIG. 2. The pre-chambers may include air injectors, spark plugs, and fuel injectors. The cylinders of the engine may be heated via air that is heated via a compressor. Alternatively, the engine may be heated via air that is compressed by the engine. Example sequences for heating an engine are shown in FIGS. 3 and 4. A flow chart of a method for heating an engine and starting the engine is shown in FIG. 5.

Referring to FIG. 1, internal combustion engine 10, comprising a plurality of cylinders, one cylinder of which is shown in FIG. 1, is controlled by electronic engine controller 12. The controller 12 receives signals from the various sensors shown in FIGS. 1 and 2. The controller may employ the actuators shown in FIGS. 1 and 2 to adjust engine operation based on the received signals and instructions stored in memory of controller 12.

Engine 10 is comprised of cylinder head 35 and block 33, which include combustion chamber 30 and cylinder walls 32. Combustion chamber 30 may alternatively be referred to as a cylinder. Piston 36 is positioned therein and reciprocates via a connection to crankshaft 40.

Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58. The intake and exhaust valves may be deactivated in a closed position so that the intake and exhaust valves do not open during a cycle of the engine (e.g., four strokes). Valve activation devices 58 and 59 may be electro-mechanical devices.

Pre-chamber 3 is shown external to and coupled to combustion chamber 30 and it may receive air via pre-chamber air injector 4. Pre-chamber 3 also includes a spark plug 5 for generating spark and combusting air-fuel mixtures formed in pre-chamber 3. In some examples, pre-chamber 3 may be incorporated into cylinder head 35. Fuel may also be injected into pre-chamber 3 via an injector as shown in greater detail in FIG. 2.

Fuel injector 66 is shown protruding into combustion chamber 30 and it is positioned to inject fuel directly into cylinder 30, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures.

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Waste gate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to a propulsive force pedal 130 for sensing force applied by human driver 132; a position sensor 154 coupled to brake pedal 150 for sensing force applied by human driver 132, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

Controller 12 may also receive input from human/machine interface 11. A request to start the engine or vehicle may be generated via a human and input to the human/machine interface 11. The human/machine interface may be a touch screen display, pushbutton, key switch or other known device. Controller 12 may also automatically start engine 10 in response to vehicle and engine operating conditions. Automatic engine starting may include starting engine 10 without input from human 132 to a device that is dedicated to receive input from human 132 for the sole purpose of starting and/or stopping rotation of engine 10 (e.g., a key switch or pushbutton). For example, engine 10 may be automatically stopped in response to driver demand torque being less than a threshold and vehicle speed being less than a threshold.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a detailed view of several pre-chambers 3 for an engine that includes a plurality of cylinders and an air injection system 299. In FIG. 2, three cylinders are shown, but the engine may include fewer or additional cylinders as indicated. In this example, air may be supplied to pre-chambers 3 via electrically driven compressor 201. Fuel may be injected upstream of electrically driven compressor 201 via fuel injector 200 as shown. In another example, fuel may be injected downstream of compressor 201. Alternatively, each of the several pre-chambers 3 may include a fuel injector 200 to inject fuel into each cylinder on an individual basis. Electrically driven compressor 201 may supply air to each of the pre-chambers 3 via conduit 210. Electrically driven compressor 201 may be activated whether or not engine 10 is running. Conduit 210 may include a check valve 202 to prevent air from flowing from pre-chambers 3 to electrically driven compressor 201. Conduit 210 may also include an air flow control valve 206. Air flows from electrically driven compressor 201 to the pre-chambers 3 via conduit 210 in the direction of arrow 205. Electrically driven compressor 201 may be activated when engine 10 is not rotating to compress and heat air. The heated air may be injected into each cylinder via air injectors 4, thereby heating the cylinders. Air that is injected into a cylinder that has open intake and/or exhaust valves may heat the combustion chamber 30 of a cylinder before exiting the cylinder via the intake or exhaust ports. Heated air may be supplied to the cylinders as long as electrically driven compressor 201 is activated.

Air injectors 4 may also be activated when compressor 210 is deactivated to heat combustion chambers 30. In particular, the engine may be rotated without fuel such that pistons compress air in the cylinders, thereby heating air in the cylinders. The heated air may be directed from a first cylinder to heat a second cylinder. For example, the air injector of a cylinder that is late in a compression stroke (e.g., within 25 degrees of TDC of the cylinder's compression stroke) or early in an expansion stroke (e.g., within 25 degrees of the cylinder's expansion stroke) may be opened and an air injector of a second cylinder may be open when the second cylinder is undergoing an intake or expansion stroke. Heated compressed air may be delivered from the first cylinder to the second cylinder as the higher pressure in the first cylinder drives the air to the lower pressure in the second cylinder. The air may flow from the first cylinder to the second cylinder as indicated by arrows 220.

In another example, air injectors 4 may be activated when the engine is rotated and the engine's poppet valves are deactivated to heat engine cylinders. Specifically, the air injector of a first cylinder may be open when a piston in the first cylinder is near top-dead-center (TDC) compression and/or exhaust stroke (e.g., ±15 degrees of TDC). At the same time, the air injector of a second cylinder may be open when a piston of the second cylinder is near bottom-dead-center (BDC) intake stroke or exhaust stroke. During such conditions, warm compressed air may flow from the first cylinder to the second cylinder, thereby heating the second cylinder. The air may flow during these conditions as indicated by arrows 220.

Thus, the system of FIGS. 1 and 2 provides for a system, comprising: an engine including a first cylinder and a second cylinder, a first pre-chamber coupled to the first cylinder, the first pre-chamber including a first spark plug and a first air injector, a second pre-chamber coupled to the second cylinder, the second pre-chamber including a second spark plug and a second air injector; an electric machine; and a controller including executable instructions stored in non-transitory memory that cause the controller to rotate the engine via the electric machine and open the first air injector and open the second air injector while not supplying fuel to the first cylinder and the second cylinder. The system includes where the first air injector and the second air injector are open simultaneously or sequentially with and without air injector opening timing overlap. For example, a first air injector may be opened, thereby pressurizing conduit 210 as shown in FIG. 2 when the compressor is not activated and when the engine is rotated. Opening of a second air injector in a second cylinder may follow the opening of the first injector such that air may be transferred between the first and second cylinders even if end of compression or start of expansion strokes of the first cylinder is not well aligned with intake or exhaust strokes of the second cylinder. The system includes where the first injector is open during a last quarter of a compression stroke (e.g., within 45 degrees of TDC compression stroke of the cylinder) of the first cylinder or a first quarter of an expansion stroke of the first cylinder (e.g., within 45 degrees of TDC expansion stroke of the cylinder). The system includes where the second injector is open during an intake or exhaust stroke of the second cylinder. The system further comprises additional instructions that cause the controller to hold closed intake and exhaust poppet valves of the first cylinder and the second cylinder. The system further comprises a compressor configured to supply air to the first air injector and the second air injector, and additional instructions to deactivate the compressor when rotating the engine via the electric machine.

Referring now to FIG. 3, an engine pre-heating sequence is shown. The engine heating sequence of FIG. 3 may be generated via the system of FIGS. 1 and 2 in cooperation with the method of FIG. 5. FIG. 3 depicts an engine heating sequence for four engine cylinders; however, the approach may also be applied to engine's having a fewer or a greater number of cylinders. The heating sequence of FIG. 3 is short in duration and the heating sequence may be lengthened for several more engine cycles when the engine temperature is cooler. In this example, the engine is started after one engine cylinder heating cycle (e.g., two engine revolutions).

The first plot from the top of FIG. 3 is a plot of engine operating state versus time. The vertical axis represents engine operating state and the engine is requested to start or is running (e.g., rotate and combust fuel and air) when trace 302 is at a higher level near the vertical axis arrow. The engine is requested to stop or is stopped (e.g., not rotating and combusting air and fuel) when trace 302 is at a lower level near the horizontal axis. The horizontal axis represents engine crankshaft position and engine crankshaft position rotates from the left side of the plot to the right side of the plot. Intake strokes are indicated by "I," compression strokes are indicated by "C," expansion or power strokes are indicated by "P," and exhaust strokes are indicated by "E." Vertical lines along the horizontal axis represent TDC and BDC locations. The horizontal axes of the other plots follow the same convention. Trace 302 represents the engine operating state.

The second plot from the top of FIG. 3 is a plot of operation of cylinder number one of an engine during an engine cylinder heating sequence. The second plot shows example opening timing for an air injector as indicated by bars 304-306. The second plot also shows example exhaust valve timing as indicated by dashed line 350. Intake valve timing for the second plot is indicated by solid line 352. Intake and exhaust valve timings for the other cylinders are indicated similarly. Additionally, fuel injection timing into cylinder number one is indicated by triangle 307 and spark timing is indicated by * 308.

The third plot from the top of FIG. 3 is a plot of operation of cylinder number two of an engine during an engine cylinder heating sequence. The third plot shows example opening timing for an air injector as indicated by bars 309-311. The intake and exhaust valve timings are indicated by dashed and solid lines as previously indicated.

The fourth plot from the top of FIG. 3 is a plot of operation of cylinder number three of an engine during an engine cylinder heating sequence. The third plot shows example opening timing for an air injector as indicated by bars 312 and 313. The intake and exhaust valve timings are indicated by dashed and solid lines as previously indicated.

In addition, fuel injection timing into cylinder number three is indicated by triangle 314 and spark timing is indicated by * 315.

The fifth plot from the top of FIG. 3 is a plot of operation of cylinder number four of an engine during an engine cylinder heating sequence. The fourth plot shows example opening timing for an air injector as indicated by bars 316 and 317. The intake and exhaust valve timings are indicated by dashed and solid lines as previously indicated. In addition, fuel injection timing into cylinder number four is indicated by triangle 318 and spark timing is indicated by * 319.

At the start of the heating sequence at the left side of FIG. 3, the engine is stopped partially through the intake stroke of cylinder number one. The intake and exhaust valves of the cylinders are operational and fuel is not being injected to the engine. The engine begins to rotate via an electric machine (not shown) and air that is trapped in cylinder number two begins to be compressed. As cylinder number two approaches top-dead-center compression stroke, the air injector in the pre-chamber of cylinder number two is opened at 309 and air that is heated in cylinder number two is delivered to cylinder number one by opening the air injector of cylinder number one at 304. The air injector of cylinder number one may be opened during the intake stroke of cylinder number one. The transfer of heated air from cylinder two to cylinder number one is indicated by arrow 360. The air that was heated in cylinder number two is heated again in cylinder number one as cylinder number one rotates through its compression stroke. The air injector of cylinder number one is opened again at 305 so that the air that is heated in cylinder number one may be delivered to cylinder number three. The heated air is transferred from cylinder number one to cylinder number three as indicated by arrow 361.

The air injector of cylinder number three may be opened during the intake stroke of cylinder number three as indicated at 312 to allow heated air from cylinder number one to flow to cylinder number three. The air flows from the higher pressure in cylinder number one to the lower pressure of cylinder number three. The heated air warms cylinder number three and it is heated again as it is compressed in cylinder number three as the engine rotates. The air injector of cylinder number three is opened again at 313 so that the heated air may be delivered to cylinder number four. The heated air is transferred from cylinder number three to cylinder number four as indicated by arrow 362.

The air injector of cylinder number four may be opened during the intake stroke of cylinder number four as indicated at 316 to allow heated air from cylinder number three to flow to cylinder number four. The air flows from the higher pressure in cylinder number three to the lower pressure of cylinder number four. The heated air warms cylinder number four and it is heated again as it is compressed in cylinder number four as the engine rotates. The air injector of cylinder number four is opened again at 317 so that the heated air may be delivered to cylinder number two. The heated air is transferred from cylinder number four to cylinder number two as indicated by arrow 363.

The air injector of cylinder number two may be opened during the intake stroke of cylinder number two as indicated at 310 to allow heated air from cylinder number four to flow to cylinder number two. The air flows from the higher pressure in cylinder number four to the lower pressure of cylinder number two. The heated air warms cylinder number two and it is heated again as it is compressed in cylinder number two as the engine rotates. The air injector of cylinder number two is opened again at 311 so that the heated air may be delivered to cylinder number one. The heated air is transferred from cylinder number two to cylinder number one as indicated by arrow 361. Thus, one engine cylinder heating cycle in which four cylinders may be heated via distributing heated air through an air supply system is shown. In this example, the first engine cylinder heating cycle is not followed by a second cylinder heating cycles, but such an approach may be followed when the engine is at a cooler temperature. In this example, combustion begins in cylinder number one when the fuel that is injected at 307 is combusted at 308. Combustion in cylinder number three follows combustion in cylinder number one when fuel that is injected at 314 is combusted at 315. Further, combustion in cylinder number four follows combustion in cylinder number three when fuel that is injected at 318 is combusted at 319.

In this way, air may be compressed and heated in one cylinder and it may be transferred to a second cylinder via rotating the engine unfueled while opening air injectors that are situated in cylinder pre-chambers. The warmed air may be passed from cylinder to cylinder via an air injection system as the engine is rotated via an electric machine.

Referring now to FIG. 4, a second engine pre-heating sequence is shown. The engine heating sequence of FIG. 4 may also be generated via the system of FIGS. 1 and 2 in cooperation with the method of FIG. 5. FIG. 4 depicts an engine heating sequence for four engine cylinders; however, the approach may also be applied to engine's having a fewer or a greater number of cylinders. The heating sequence of FIG. 4 is short in duration and the heating sequence may be lengthened for several more engine cycles when the engine temperature is cooler. The plots of FIG. 4 show similar timings and signals as where described in the explanation of FIG. 3. Therefore, for the sake of brevity, the description of the signals and plot axes is not repeated.

At the start of the heating sequence at the left side of FIG. 4, the engine is stopped partially through the power stroke of cylinder number one. The intake and exhaust valves of the cylinders are deactivated in this example and fuel is not being injected to the engine. The engine begins to rotate via an electric machine (not shown) and air that is trapped in cylinder number three begins to be compressed in cylinder number three. Opening timing for air injectors of cylinder number one occur at 404-408. Opening timing for air injectors of cylinder number two occur at 409-413. Opening timing for air injectors of cylinder number three occur at 414-418. Opening timing for air injectors of cylinder number four occur at 419-423.

In this sequence, heated air flows from high pressure cylinders that have pistons near TDC (compression and exhaust) to lower pressure cylinders that have pistons near BDC (expansion and intake) when the engine rotates due to the cylinder's poppet valves being deactivated in closed positions.

On the left side of the sequence, as cylinder number two approaches top-dead-center intake stroke or as cylinder number three approaches top-dead-center compression stroke, the air injectors in the pre-chambers of all cylinders are opened at 404, 409, 414, and 419. Air is pumped from cylinder number three primarily into cylinder number four as indicated by solid arrow 453 and secondarily into cylinder number one as indicated by dashed arrow 451. Similarly, air is pumped from cylinder number two primarily into cylinder number one as indicated by solid arrow 450 and secondarily into cylinder number four as indicated by dashed arrow 452.

Thus, the air that is heated during the compression and exhaust strokes of cylinders two and three may be applied to heat cylinders one and four.

As the engine continues to rotate into a second series of strokes, cylinder number three approaches bottom-dead-center expansion stroke, the air injectors in the pre-chambers of all cylinders are opened at 405, 410, 415, and 420. Air is pumped from cylinder number four primarily into cylinder number three as indicated by a solid arrow and secondarily into cylinder number two as indicated by a dashed arrow. Similarly, air is pumped from cylinder number one primarily into cylinder number two as indicated by a solid arrow and secondarily into cylinder number three as indicated by a dashed arrow. Thus, the air that is heated during the compression and exhaust strokes of cylinders four and one may be applied to heat cylinders two and three. The sequence repeats after rotating through the second series of strokes.

In this way, air may be compressed and heated in one cylinder and it may be transferred to a second cylinder via rotating the engine unfueled while opening air injectors that are situated in cylinder pre-chambers. The warmed air may be passed from cylinder to cylinder via an air injection system as the engine is rotated via an electric machine. The air may be passed from cylinder to cylinder even though the intake and exhaust valves have been deactivated due to pressure differentials in the cylinders.

Referring now to FIG. 5, a flow chart of a method for pre-heating engine cylinders and starting an engine is shown. The method of FIG. 5 may be incorporated into and may cooperate with the system of FIGS. 1 and 2. Further, at least portions of the method of FIG. 5 may be incorporated as executable instructions stored in non-transitory memory while other portions of the method may be performed via a controller transforming operating states of devices and actuators in the physical world.

At 502, method 500 determines operation conditions. Operating conditions may include but are not limited to ambient temperature, engine temperature, barometric pressure, engine intake manifold temperature, and engine oil temperature. The engine operating conditions may be determined via the various sensors described herein. Method 500 proceeds to 504.

At 504, method 500 judges if a cold engine start (e.g., start of an engine when engine temperature is less than a threshold temperature, such as 20 degrees Celsius) is requested. An engine start may be requested via a human providing input to a controller, via a controller, or via a signal from a remote device (e.g., key fob). If method 500 determines that there is an engine start is requested, the answer is yes and method 500 proceeds to 506. Otherwise, the answer is no and method 500 proceeds to 570.

At 570, method continues to operate the engine in its present state. If the engine is off and not combusting air and fuel, the engine remains off. If the engine is running and combusting fuel, the engine continues to run. Method 500 proceeds to exit.

At 506, method 500 judges if the engine is to be rotated to heat the engine. If so, the answer is yes and method 500 proceeds to 520. Otherwise, the answer is no and method 500 proceeds to 508. In one example, method 500 may judge to not rotate the engine to heat the engine if the vehicle powertrain does not include an electric machine as a propulsion source. Further, method 500 may judge not to rotate the engine to heat the engine if a state of charge of a battery is less than a threshold. Method 500 may judge to rotate the engine to heat the engine if the engine includes an integrated starter/generator or other electric machine that may provide propulsive effort to a vehicle driveline.

At 508, method 500 activates an electrically driven compressor to provide compressed air to pre-chambers of engine cylinders. Method 500 proceeds to 510 after the electrically driven compressor is activated. The electrically driven compressor may heat air via compressing the air and the heated air may be supplied to engine cylinders as shown in FIG. 2. Method 500 may also open an air flow control valve to enable air flow to air injectors in the cylinder pre-chambers.

At 510, method 500 opens one or more air injectors in pre-chambers of engine cylinders. Opening the air injectors may allow air that is heated by the electrically driven compressor to enter engine cylinders. The air injectors may be opened sequentially one at a time and without air injection times overlapping. Alternatively, method 500 may activate and open all or a group of the air injectors at a same time. The pressurized air from the electrically driven compressor may enter engine cylinders via the pre-chambers to heat combustion chamber surfaces. The electrically driven compressor may be on or off at the time when the air injectors are opened.

The engine cylinders may be stopped in positions where intake or exhaust valves of a cylinder receiving the heated air via the pre-chamber are open. The open intake or exhaust valves allow heated air that has transferred thermal energy to the combustion chamber to exit the cylinder. The air that is displaced from the cylinder may be replaced with heated air that recently passed through the electrically driven compressor so as to provide a continuous stream of heated air to the engine cylinder. Consequently, heat may be transferred readily from the air to the combustion chamber. The engine is not rotated or supplied with fuel during step 510. Method 500 proceeds to 512.

At 512, method 500 may bleed excess air pressure from cylinders that have closed intake and exhaust valves. The engine may be stopped at a location where intake and exhaust valves of one or more cylinders may be fully closed, thereby preventing flow of air out of the cylinder by way of the cylinder's poppet valves. If an air injector is opened to allow heated air to enter a cylinder that has closed intake and exhaust valves, air will flow into the cylinder with the open air injector. However, flow into this cylinder may stop, thereby limiting the thermal energy that may be transferred to the cylinder. To overcome this limitation, an air injector of a cylinder (a first cylinder) may be open and an air injector of a cylinder with an open intake or exhaust valve (a second cylinder) may be opened simultaneously so that a lower pressure may be induced in the air supply line that allows air to flow out of the first cylinder and back into the air supply line where it may eventually exit the engine via the second cylinder. The electrically driven compressor may be switched off temporarily during the air bleed off process. The air injector in the pre-chamber of the second cylinder may be repeatedly opened and closed while the air injector in the pre-chamber of the first cylinder is held open. Such operation may allow pulsed air flow into and out of the first cylinder so that air in the first cylinder may be replaced with newly warmed air. In this way, air may be added to and removed from a cylinder with closed intake and exhaust valves to improve heating of the cylinder. Method 500 proceeds to 514.

At 514, method 500 judges if the engine's cylinders are at desired temperatures. If so, method 500 proceeds to 516. If not, method 500 returns to 510 to continue supplying warm air to the engine's cylinders.

At 516, method 500 rotates the engine and starts the engine. The engine may be rotated via a flywheel starter, ISG, or other electric machine. Spark and fuel are supplied to the engine's cylinders while the engine is rotated. Method 500 proceeds to exit after the engine is started.

At 520, method 500 judges if the engine's poppet valves are to be deactivated in closed positions to prevent air flow out of the cylinders by way of the cylinder's poppet valves. If so, the answer is yes and method 500 proceeds to 540. If not, the answer is no and method 500 proceeds to 522. Method 500 may judge to deactivate the engine's poppet valves if there may be a possibility of fuel droplets being trapped in the cylinders so that engine emissions may be maintained at a lower level. In this way, fuel may be held in engine cylinders until combustion is initiated in the engine cylinders. Alternatively, method 500 may deactivate or not deactivate the engine's poppet valves according to capabilities of valve activators/deactivators.

At 522, method 500 rotates the engine via an electric machine. In one example, method 500 may rotate the engine via an ISG, a flywheel starter, or other electric machine. By rotating the engine, the engine may rotate through compression and expansion strokes. Method 500 proceeds to 524.

At 524, method 500 opens and closes intake and exhaust poppet valves as the engine rotates. The poppet valves may be opened and closed via cams or other known means. Method 500 does not supply fuel to the engine while the engine is rotating. Method 500 proceeds to 526.

At 526, method 500 simultaneously opens an air injector of a first cylinder undergoing late compression (e.g., within 25 degrees of TDC of the cylinder's compression stroke) or late expansion and opens an air injection valve of a second cylinder undergoing an intake or exhaust stroke. Air compressed in the first cylinder is delivered to the second cylinder by way of a conduit that couples the pre-chamber of the first cylinder and the pre-chamber of the second cylinder as shown in FIG. 3. In this way, air heated during compression of the first cylinder may be applied to warm a combustion chamber of a second cylinder. The air injector of the second cylinder may be opened during its compression stroke to release hot air to a third cylinder and so on as illustrated in FIG. 3. It should be noted that the air injector timings of the first and second cylinder do not have to open and close the respective injectors at same times. Method 500 proceeds to 528.

At 528, method 500 judges if the engine's cylinders are at desired temperatures. If so, the answer is yes and method 500 proceeds to 530. Otherwise, the answer is no and method 500 returns to 526 to continue heating engine cylinders.

At 530, method 500 rotates the engine and starts the engine. The engine may be rotated via a flywheel starter, ISG, or other electric machine. Spark and fuel are supplied to the engine's cylinders while the engine is rotated. Method 500 proceeds to exit after the engine is started.

At 540, method 500 deactivates the engine's poppet valves so that the poppet valves do not open when the engine is rotated. The poppet valves are deactivated in a closed state. Method 500 proceeds to 542.

At 542, method 500 rotates the engine via an electric machine. In one example, method 500 may rotate the engine via an ISG, a flywheel starter, or other electric machine. By rotating the engine, the engine may rotate through compression and expansion strokes. Method 500 proceeds to 544.

At 544, method 500 method 500 simultaneously opens an air injector of a first cylinder near TDC (e.g., within 25 degrees of TDC of the cylinder) and opens an air injection valve of a second cylinder near BDC (e.g., within 25 degrees of BDC of the cylinder). Air compressed in the first cylinder is delivered to the second cylinder by way of a conduit that couples the pre-chamber of the first cylinder and the pre-chamber of the second cylinder as shown in FIG. 4. In this way, air heated during compression of the first cylinder may be applied to warm a combustion chamber of a second cylinder. The air injector of the second cylinder may be opened near TDC to release hot air to the first cylinder when the first cylinder returns to BDC as illustrated in FIG. 4. Method 500 proceeds to 548.

At 548, method 500 judges if the engine's cylinders are at desired temperatures. If so, the answer is yes and method 500 proceeds to 548. Otherwise, the answer is no and method 500 returns to 544 to continue heating engine cylinders.

At 548, method 500 rotates the engine and starts the engine. The engine may be rotated via a flywheel starter, ISG, or other electric machine. Spark and fuel are supplied to the engine's cylinders while the engine is rotated. Method 500 proceeds to exit after the engine is started.

In this way, cylinders of an engine may be pre-heated to improve engine starting. Once the cylinders reach a desired temperature, the engine may be started.

Thus, the method of FIG. 5 provides for a method for operating an engine, comprising: activating a compressor and injecting air into a pre-chamber of a cylinder in response to an engine start request. The method includes where an engine that includes the cylinder is not rotating. The method includes where the cylinder is a first cylinder and where a first injector injects air into the first cylinder, and further comprising: a second cylinder, and opening a second injector to inject air into the second cylinder. The method includes where the first injector and the second injector are open at a same time. The method includes where the first injector and the second injector are open at different times. The method includes where intake and exhaust poppet valves of the first cylinder are closed. The method includes where intake and exhaust poppet valves of the second cylinder are closed. The method includes where the compressor is an electrically driven compressor. The method includes where the pre-chamber includes a spark plug.

The method of FIG. 5 also provides for an engine operating method, comprising: rotating an engine without supplying fuel to the engine during a cycle of the engine via an electric machine and injecting air into a pre-chamber of a first cylinder of the engine during the cycle in response to a request to start the engine. The method further comprises injecting air into a pre-chamber of a second cylinder during the cycle while injecting air into the pre-chamber of the first cylinder. The method further comprises opening and closing poppet valves of the first cylinder and the second cylinder while rotating the engine. The method further comprises holding poppet valves of the first cylinder and the second cylinder closed over an entire cycle of the engine while rotating the engine. The method includes where air is injected into the pre-chamber of the first cylinder at a same time air is injected into the pre-chamber of the second cylinder.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, 13, 14, 15, 16, V6, V8, V10, and V12 engines operating in natural gas, gasoline, or alternative fuel configurations could use the present description to advantage.

The invention claimed is:

1. A method for operating an engine, comprising:
activating a compressor and transferring heated air from a first cylinder to a second cylinder via opening a first air injector in the first cylinder and opening a second air injector in the second cylinder in response to an engine start request.

2. The method of claim 1, where an engine that includes the cylinder is rotating.

3. The method of claim 2, where the cylinder is a first cylinder and where a first injector injects air into the first cylinder, and further comprising:
a second cylinder, and opening a second injector to inject air into the second cylinder.

4. The method of claim 3, where the first injector and the second injector are open at a same time.

5. The method of claim 4, where intake and exhaust poppet valves of the first cylinder are closed.

6. The method of claim 4, where intake and exhaust poppet valves of the second cylinder are closed.

7. The method of claim 1, further comprising transferring heated air from the second cylinder to a third cylinder.

8. The method of claim 1, where the compressor is an electrically driven compressor.

9. The method of claim 1, where the first cylinder includes a pre-chamber and a spark plug.

10. A system, comprising:
an engine including a first cylinder and a second cylinder, a first pre-chamber coupled to the first cylinder, the first pre-chamber including a first spark plug and a first air injector, a second pre-chamber coupled to the second cylinder, the second pre-chamber including a second spark plug and a second air injector;
an electric machine; and
a controller including executable instructions stored in non-transitory memory that cause the controller to rotate the engine via the electric machine and open the first air injector and open the second air injector while not supplying fuel to the first cylinder and the second cylinder.

11. The system of claim 10, where the first air injector and the second air injector are open simultaneously.

12. The system of claim 11, where the first air injector is open during a last quarter of a compression stroke of the first cylinder or a first quarter of an expansion stroke of the first cylinder.

13. The system of claim 12, where the second air injector is open during an intake or exhaust stroke of the second cylinder.

14. The system of claim 10, further comprising additional instructions that cause the controller to hold closed intake and exhaust poppet valves of the first cylinder and the second cylinder.

15. The system of claim 10, further comprising a compressor configured to supply air to the first air injector and the second air injector, and additional instructions to deactivate the compressor when rotating the engine via the electric machine.

16. An engine operating method, comprising:
rotating an engine without supplying fuel to the engine during a cycle of the engine via an electric machine and injecting air into a pre-chamber of a first cylinder of the engine during the cycle in response to a request to start the engine.

17. The method of claim 16, further comprising injecting air into a pre-chamber of a second cylinder during the cycle while injecting air into the pre-chamber of the first cylinder.

18. The method of claim 17, further comprising opening and closing poppet valves of the first cylinder and the second cylinder while rotating the engine.

19. The method of claim 17, further comprising holding poppet valves of the first cylinder and the second cylinder closed over an entire cycle of the engine while rotating the engine.

20. The method of claim 17, where air is injected into the pre-chamber of the first cylinder at a same time air is injected into the pre-chamber of the second cylinder.

* * * * *